United States Patent [19]
Ostrander

[11] Patent Number: 4,873,483
[45] Date of Patent: Oct. 10, 1989

[54] MULTI INPUT LIGHTNING DETECTION SYSTEM

[75] Inventor: Kenneth A. Ostrander, St. Paul, Minn.

[73] Assignee: Minnesota Mining and Manufacturing Company, St. Paul, Minn.

[21] Appl. No.: 273,081

[22] Filed: Nov. 18, 1988

Related U.S. Application Data

[62] Division of Ser. No. 145,276, Jan. 19, 1988, Pat. No. 4,803,421.

[51] Int. Cl.⁴ ............................................. G01W 1/16
[52] U.S. Cl. .................................... 324/72; 73/170 R
[58] Field of Search ............... 324/72, 77 R; 340/600, 340/601, 540; 73/170 R

[56] References Cited

U.S. PATENT DOCUMENTS

| | | | |
|---|---|---|---|
| 3,715,660 | 2/1973 | Ruhnke | 324/72 |
| 4,023,408 | 5/1977 | Ryan et al. | 73/170 R |
| 4,198,599 | 4/1980 | Krider et al. | 324/72 |
| 4,365,192 | 12/1982 | Rankin et al. | 324/72 |
| 4,395,906 | 8/1983 | Ryan et al. | 324/72 |
| 4,422,037 | 12/1983 | Coleman | 324/72 |
| 4,672,305 | 6/1987 | Coleman | 324/72 |
| 4,684,951 | 8/1987 | Baumer | 324/72 |

Primary Examiner—Reinhard J. Eisenzopf
Assistant Examiner—Maura K. Regan
Attorney, Agent, or Firm—Donald M. Sell; Walter N. Kirn; William B. Barte

[57] ABSTRACT

An apparatus for providing a map-like display of weather phenomena such as lightning discharges, in which the distance from an observation location to the source of the discharge is determined from the ratio of the integrated intensity of two different components of lightning produced signals, the intensity of the first component varying as the inverse of the distance and the intensity of the second component varying as the inverse of the square of the distance.

4 Claims, 9 Drawing Sheets

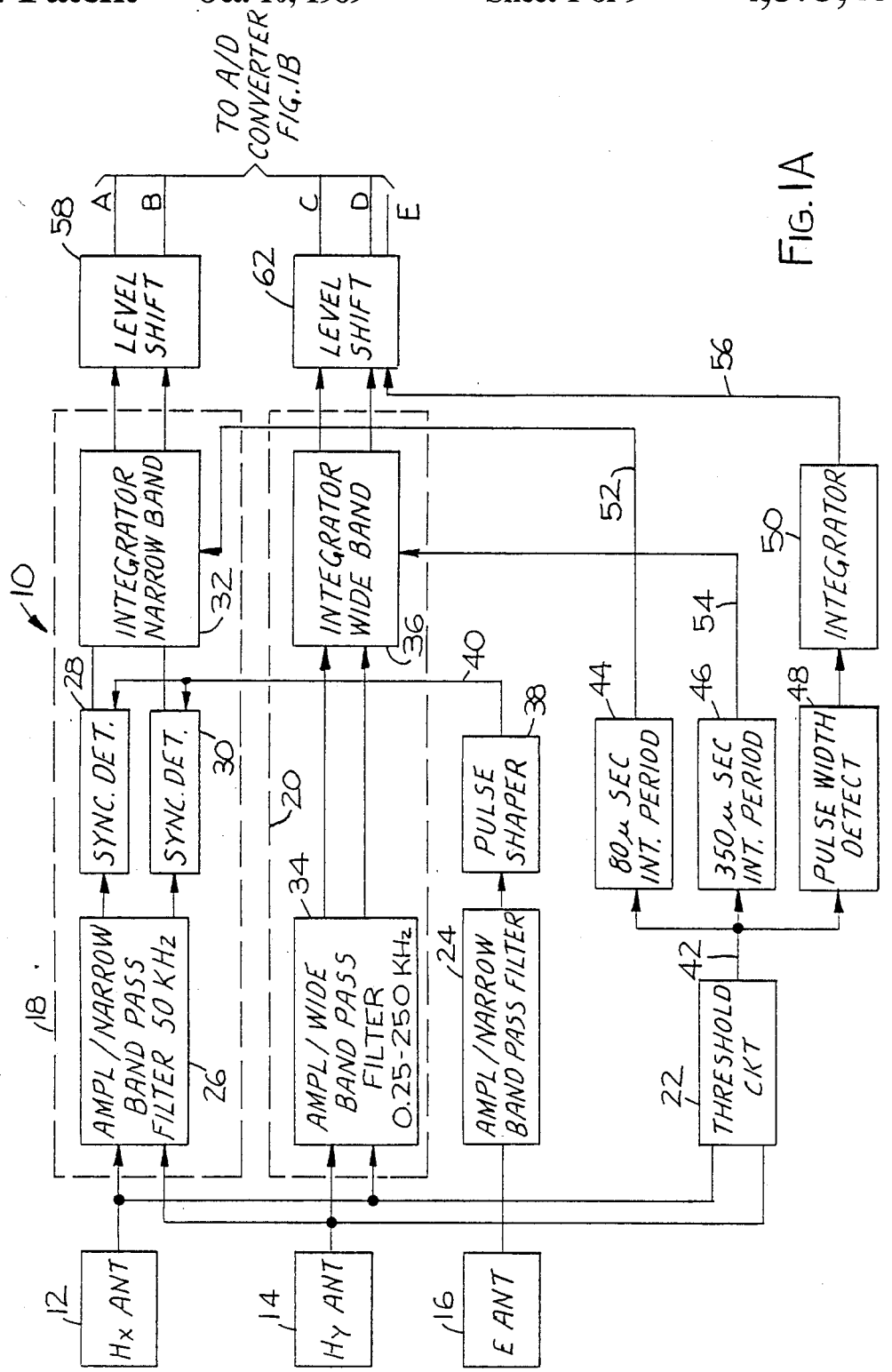

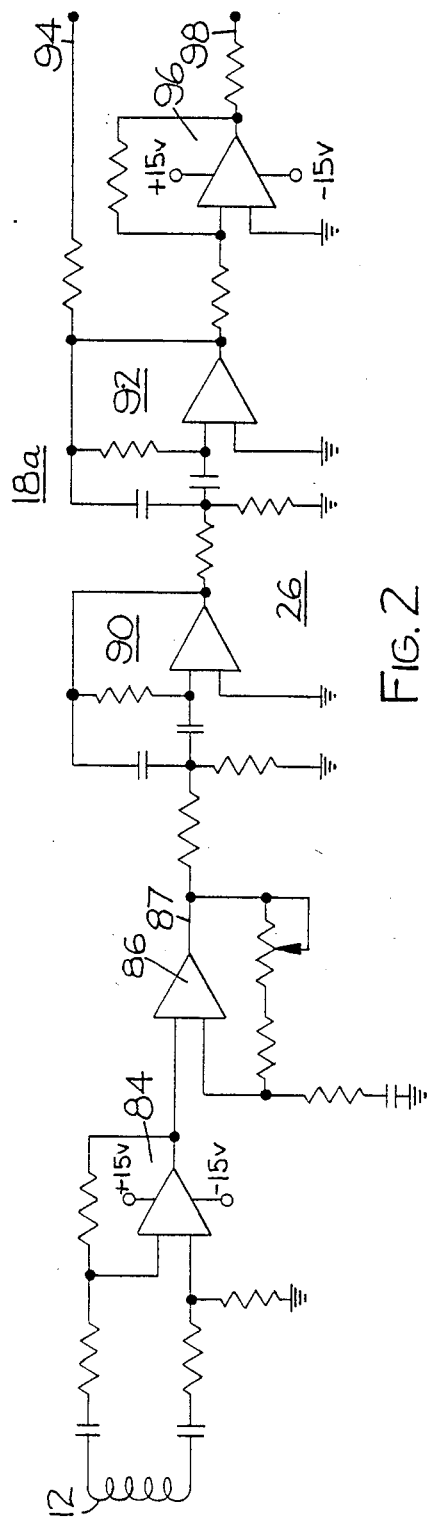
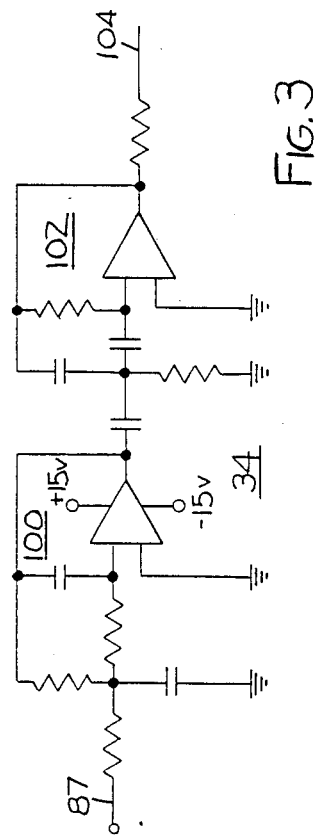
FIG. 2
FIG. 3

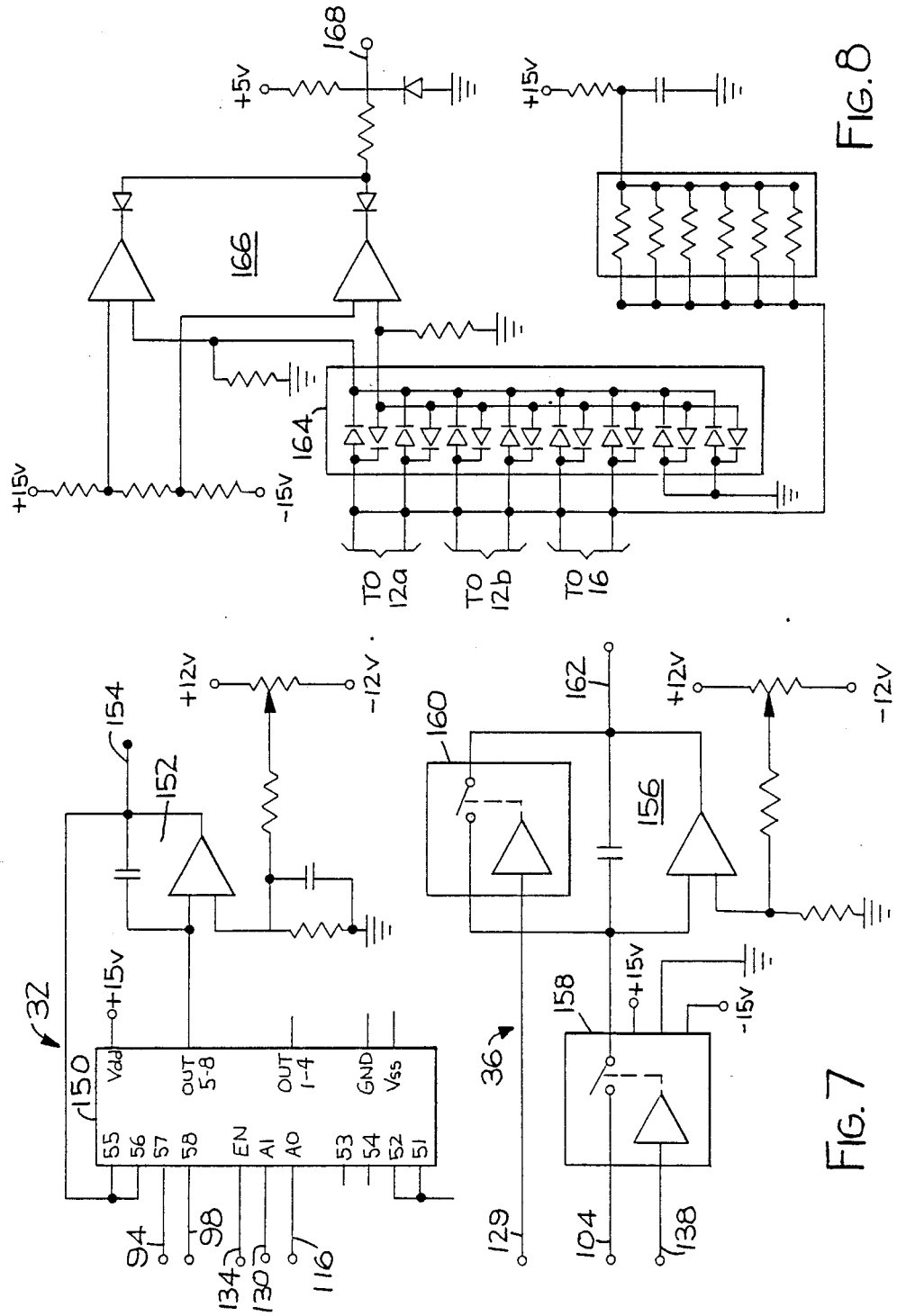

MULTI INPUT LIGHTNING DETECTION SYSTEM

This is a division of application Serial No. 145,276, filed Jan. 19, 1988, Now U.S. Pat. No. 4,803,421.

TECHNICAL FIELD

This invention relates to weather mapping systems, and in particular to systems in which lightning discharges are detected and the location of the discharges is graphically displayed relative to an observation location.

BACKGROUND ART

Various systems for graphically displaying the location of lightning based on signals received at a single observation have been previously developed. For example, in U.S. Pat. No. 3,715,660, (Ruhnke) there is described an apparatus for determining the distance between lightning strokes and an observation location based on the ratio of signals representing the magnetic and electric field components of the electromagnetic field associated with the discharge. No suggestion is there presented concerning the determination of the direction of the discharge nor of graphically portraying the relative location.

A direct ancestor of the present system is disclosed in U.S. Pat. No. 4,023,408 (Ryan). Like Ruhnke, Ryan proposes to utilize crossed loop magnetic field antennas to detect the magnetic field component. According to Ryan, however, those signals are then processed to provide both direction and distance or range information. An electric field antenna is also provided, and correlated magnetic and electric signals are processed, integrated and ultimately inverted to provide a signal representative of range. The system there disclosed has proven to be commercially viable, particularly in apparatus adapted for use in small propeller driven aircraft. However, the accuracy of the range signals has limited the application of the system.

U.S. Pat. No. 4,422,037 (Coleman) depicts a subsequently developed system which incorporates a number of the features included in the two references previously discussed. As there set forth, range is determined on the basis of the ratio of the magnetic (H) to electric (E) field values, with improved accuracy to be obtained by comparing the obtained values against known values for strikes occurring in three ranges, near field, mid field and far field. Validity of displayed data is further to be improved by requiring incoming signals to reach a predetermined threshold level within a predetermined time period. Additionally, a companion patent (U.S. Pat. No. 4,672,305) depicts an improved system for extending the range by utilizing the ratio of low (1.5kHz) and high (500kHz) frequency magnetic field components.

SUMMARY OF THE INVENTION

The apparatus of the present invention is predicated on the assumption that the field equations for the electromagnetic field associated with lightning discharges can be broken down into at least three components, that associated with the static field, that associated with the conductive or inductive field and that associated with the radiation field. As the three components may be individually isolated based on properties unique to each component, and as the various components vary as an inverse function of the range ($1/R$), the square of the range ($1/R^2$) or the cube of the range ($1/R^3$), the ratio of two components, each of which vary as a different function of the range, may be taken to obtain information on the range which is independent of all other data.

Accordingly, the apparatus of the present invention enables the determination of the geographic location of electrical disturbances generated by weather phenomena relative to an observation location. The apparatus comprises means for independently receiving signals generated by the electrical disturbances which are both indicative of the direction from the observation location to the location of the disturbance a disturbance.

Means are also provided for isolating from the received signals at least a first component, the intensity of which is an inverse function of distance between the discharge and the observation location. Means responsive to said received signals generates a time-of-zero crossing signal, and simultaneously combines that signal with the first component to derive a range signal which is indicative of the distance. The inclusion of the time-of-zero crossing signal thereby improves the accuracy of the range signal. Means responsive to the direction indicative signals derive a direction signal. The range and directional signals may then be used to control display means to provide a map-like display of the location of the disturbances relative to the observation location.

In a preferred embodiment, the receiving means is responsive to at least certain of electric and magnetic field components of the electromagnetic fields for producing at least two received signals representative of the following components: the electrostatic field, the conductive electric field, the radiated electric field, the conductive magnetic fields associated with one or both orthogonal directions and the radiative magnetic field associated with one or both orthogonal directions. Also, the isolating means preferably comprises band pass filter means for passing as the first component a limited, relatively narrow frequency band portion of the received signals, which portion is particularly representative of far, or radiated, electromagnetic field components, especially the magnetic field portion thereof, and may desirably further include means responsive to the rate of change of the selected relatively narrow frequency band portion for integrating the absolute intensity of the selected portion occurring during a predetermined time period following a discharge to thereby provide a first isolated component which is an inverse function of the distance. To provide the second isolated component, the isolating means preferably comprises a wide band filter means for passing substantially all frequency components of the received signals, especially the magnetic field portion thereof and bipolar integration means for integrating the output of the wide band filter means occurring during a predetermined time period following the discharge. Such bipolar signal components, in which the rate of change of currents associated with discharges are averaged out, result in the intensity of the second isolated component being an inverse function of the square of the distance Digital signal processing may also be used to isolate the components considering that the received signal is a composite of both current and rate of change or derivative of current.

In a further preferred embodiment of the present invention, the received distance-related signals are desirably processed to yield a time-of-first zero crossing signal, which is combined with the first and second isolated components to compensate for differences in the components as may result from cloud-to-cloud discharges versus cloud-to-ground discharges.

GENERAL THEORY

The EM field associated with lightning discharges contains both electric (E) and magnetic (H) field components which may be detected via conventional antennas to obtain a uni-directional E field signal and bi-directional $H_x$ and $H_y$ signals. Furthermore, each of these signals is the aggregate of the static field, the conductive or inductive field, and the radiated field. The fundamental equations range equations for those field components are:

$$E_{static} = \frac{1}{4\pi\epsilon} \frac{M}{R^3} \quad H_{static} = 0 \begin{pmatrix} \text{no magnetic} \\ \text{monopole} \end{pmatrix}$$

$$E_{conductive} = \frac{1}{4\pi\epsilon} \frac{dM/dt}{CR^2} \quad H_{conductive} = \frac{1}{4\pi\epsilon z} \frac{dM/dt}{CR^2}$$

$$E_{radiated} = \frac{1}{4\pi\epsilon} \frac{d^2M/dt^2}{C^2R} \quad H_{radiated} = \frac{1}{4\pi\epsilon z} \frac{d^2M/dt^2}{C^2R}$$

where:
M=charge moment, hence dM/dt=current moment and
$d^2M/dt^2$=rate of change of current moment
R=range Since the static field is a function of $1/R^3$, i.e., it decays very rapidly, the component in the aggregate E signal ascribable to the static field will only be appreciable if the range is small, i.e., the source of the signal (the lightning discharge) is close to the observation location. In the other extreme, the radiative field is a function of 1/R, hence it decays the least rapid of all and its contribution to the aggregate E or H signal will be significant even when the signal source is at an intermediate distance Assuming that the respective aggregate signals can be processed and the individual components isolated, "near field", "far field" and "mid field" signals can thus be obtained.

Isolation of the respective far field and mid field signals is preferably done as follows:

(a) far, or radiation field: The isolation of this signal is predicated on the empirically obtained knowledge that the magnetic portion of the radiation field related signal extends over a narrow frequency range, and that it arises from the time rate of change of current and hence is bipolar in nature. (I.e., a positive pulse occurs as the current in the discharge increases, and a negative pulse occurs as the discharge current decreases). Separate far field signal isolation circuits are thus desirably provided for both $H_x$ and $H_y$ signals, each of which circuits include narrow band pass filters having a band pass preferably centered at 50kHz, Q approximately equal to 5, coupled to the respective $H_x$ or $H_y$ antenna, for passing the 50kHz portion of those signals. Each thus filtered component is then coupled to a separate absolute, or full wave integrator, so that both positive and negative portions of the filtered components occurring over a selected time interval are accumulated. The accumulated $H_x$ and $H_y$ processed signals are then compared, and the larger of the two selected for further processing on the assumption that that signal is proportionate to 1/R.

(b) mid, or inductive, field: The isolation of this signal component is predicated on the understanding that mid range produced signals decay more rapidly than do the far field components, have a broad frequency content and have a wave shape related to the current in the discharge, rather than the rate of change of the current as in the far field component, such that the signal has a single polarity associated with the direction of current flow in the discharge, whether it be cloud-to-ground, ground-to-cloud, or cloud-to-cloud in nature. The mid field signal isolation circuit also desirably separately processes the H and Hr components, and accordingly, each respective $H_x$ and $H_y$ part of the circuit first includes a broad band pass filter for passing signals in the range of 0.25-250kHz, thereby eliminating only extraneous signals unrelated to lightning activity. Each of these broad band signals is then coupled to a separate, wide band pass, bipolar integrator which sums each entire signal such that the bipolar components characterizing the far field or rate-of-change-of-current components are canceled out, leaving accumulated signals representing only the current detected in the respective $H_x$ or $H_y$ antenna. The larger of the accumulated $H_x$ and $H_y$ mid field components is then also selected for further processing on the basis that that signal is proportionate to $1/R^2$.

The ratio of the respective far field signal, characterized by a 1/R dependence and that of the mid field signal, characterized by a $1/R^2$ dependence is subsequently determined in order to obtain a signal directly indicative of the range (R), i.e., the distance from the discharge to the observation location. The determination of the range in the above manner thus eliminates a major source of error in prior systems for determining the distance of lightning discharges, i.e., that due to the radial spread phenomena. Such a phenomena arises in that the electromagnetic fields associated with lightning discharges are a function of the current and rate of change of the current in the discharge and also of the length of the channel, i.e., the transmitting antenna length, and will thus depend upon the length of the discharge. Thus variations dependent upon the height of the cloud for cloud-to-ground discharge or distance between clouds for cloud-to-cloud discharges will give rise to an averaging of prior range determination. As in the present invention, range is based on the ratio of signals, one being dependent on 1/R and the other on $1/R^2$, errors due to such variations are eliminated.

In the preferred embodiment of the present invention, range is thus determined by processing conductive and radiative, i.e., the mid and far field components of the magnetic portion of the electromagnetic field. As noted above, any two components, one being inversely associated with one order (r, $r^2$, or $r^3$) of the range and another with another order may similarly be processed.

The direction to the discharge is conventionally determined from the relative amplitude of the $H_x$ and $X_y$ signal components, while, in the present preferred embodiment, the unipolar electric field component is utilized in a synchronous detector to resolve a 180° ambiguity arising from the comparison of the $H_x$ and $H_y$ amplitudes. The processing of the respective signal components has been described hereinabove in terms of an analog embodiment involving active and inactive band pass filters, integrators, amplifiers, and the like. It is also well recognized that the incoming signals may be directly processed in digital form. In a presently preferred embodiment, such digital processing is desirably utilized in further acting on the separated far and mid field signals. Thus those signals are coupled through a programmable logic device (PLD) to A/D converters and the digital counterparts input to a system microprocessor within which the comparison of the respective digital signals are processed, compared, stored, etc. in order to obtain the actual signals used to drive the display.

BRIEF DESCRIPTION OF THE DRAWINGS

FIGS. 1A and 1B are block diagrams of preferred embodiments of the present invention;

FIG. 2 is a more detailed circuit diagram of a first detector portion of the embodiment of FIG. 1;

FIG. 3 is a more detailed circuit diagram of a second detector of the embodiment of FIG. 1;

FIG. 7 is a more detailed circuit diagram of the integrator networks of the embodiment of FIG. 1;

FIG. 8 is a detailed circuit diagram of a window detector for sensing the status of both the magnetic and electric field antennas;

DETAILED DESCRIPTION

Figure 1B:
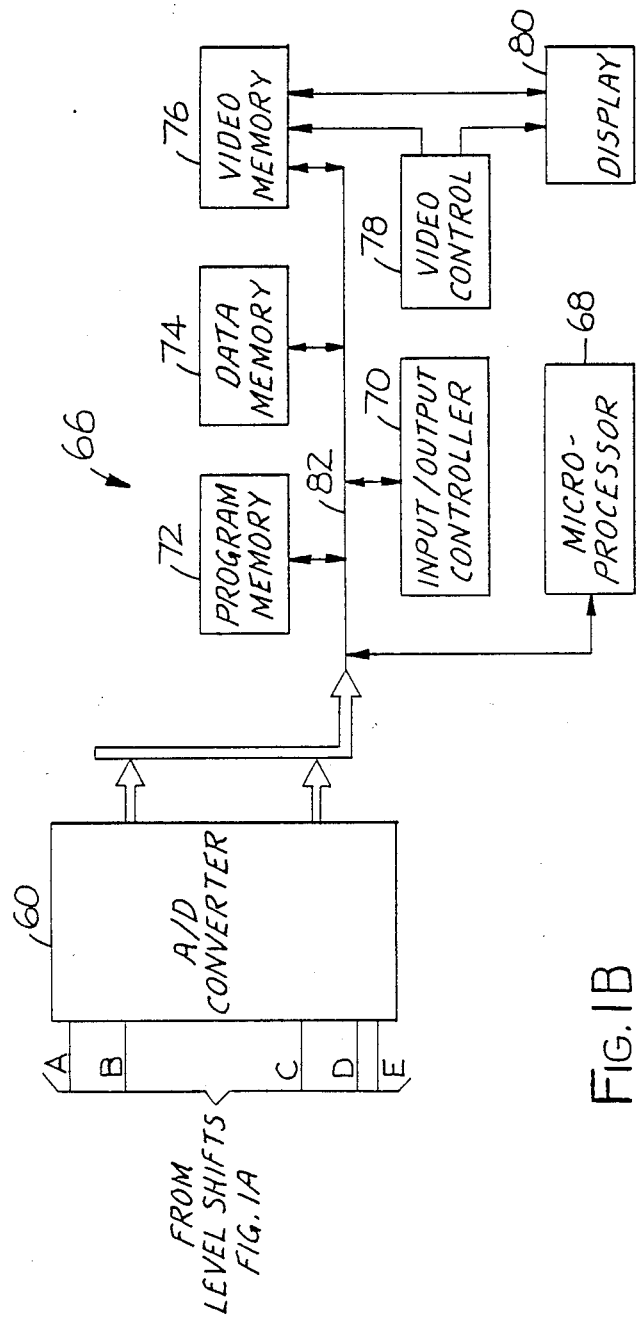

As shown in FIG. 1, a preferred embodiment of the lightning detection system 10 of the present invention includes a pair of antennas 12 and 14 for detecting magnetic components of the electromagnetic field associated with lightning discharges along two mutually orthogonal directions. Thus, for example, the antenna 12, labeled $H_x$, may be positioned to detect signals perpendicular to the fuselage of an aircraft, whereas the antenna 14, labeled $H_y$, will be positioned to detect signals parallel to the fuselage of an aircraft. Also, an antenna 16 is positioned to detect the uni-directional electric field component of such an electromagnetic field, and is desirably vertically polarized, thereby providing maximum sensitivity to cloud-to-ground discharges.

As further shown in FIG. 1, the magnetic field antennas 12 and 14 are each respectively coupled to a far field detector 18, a mid field detector 20, and a threshold circuit 22, while the electric field antenna 16 is coupled to an amplifier/filter 24. The $H_x$ and $H_y$ signals within the far field detector 18 are each independently processed within an amplifier narrow band pass filter 26 so as to allow only a narrow band centered at 50kHz signal to pass therethrough. These filtered components are then synchronously detected in the synchronous detectors 28 and 30 to remove 180° ambiguities, as discussed hereafter, and are subsequently passed to separate integrators within the integrator circuit 32. Within the integrator circuit 32 each of the $H_x$ and $H_y$ inputs are processed through full wave integrators so as to produce an integrated value which represents the absolute sum of the input signal values, regardless of polarity.

In a somewhat similar manner, the input signals from each $H_x$ and $H_y$ antennas, 12 and 14 respectively, are also coupled to the mid field detector 20, and within that detector are passed through independent amplifier/wide band pass filter networks 34. These networks are tuned to pass frequencies extending from approximately 0.25 to 250kHz. After being thus amplified, the signals are passed to an integrator network 36 where each of the signals $H_x$ and $H_y$ are integrated within bipolar, wide band pass integrators to provide respective outputs in which positive and negative far field input signals cancel each other while unipolar mid field signals are appropriately integrated.

To ensure synchronous detection of the magnetic and electric field components, thereby enabling resolution of a 180° ambiguity, the electric field antenna 16 is processed through the amplifier/filter 24 which has the same bipolar narrow band pass characteristics as the amplifier/filter 26 within the far field detector 18. Thus the 50kHz band width limited electric field signal is coupled through the filter 24 to a pulse shaper network 38 which provides a square wave output upon the occurrence of each electric field pulse. This output is coupled on lead 40 to the synchronous detectors 28 and 30 and enables a positive output from the synchronous detectors 28 and 30 when the phase of the input signals $H_x$ and $H_y$ is the same as that provided from the electric field antenna 16 and alternatively, a negative output from the synchronous detectors 28 and 30 when the phase of $H_x$ and $H_y$ components is opposite that provided from the electric field antenna 16.

The magnetic signals from the $H_x$ and $H_y$ antennas, 12 and 14 respectively, are further coupled to a threshold circuit 22 which compares the level of input signals against a reference voltage representative of the minimum amplitude of valid signals to be detected, i.e., those resulting from the most distant discharges of interest. When signals exceeding that threshold or reference level are detected, a strobe signal is produced on lead 42. This signal is in turn coupled to timing circuits 44 and 46 to provide 80 microsecond and 350 microsecond integration periods, respectively. The 80 microsecond integration period signal is output from the timing circuit 44 on lead 52 to control the integration period of the narrow band integrator 32. Similarly, the timing circuit 46 provides a 350 microsecond delayed pulse on lead 54 which is coupled to control the integration period within the integrator 36. The 80 microsecond integration period provided by the timer 44 thus enables the integrator 32 to begin accumulation of output signals at the onset of a discharge and to collect signals passed through the 50kHz band pass filter for an 80 microsecond period, thereby accumulating virtually the entire far field component present in that portion of the signals, while eliminating extraneous noise present after the initial 80 microsecond period. Similarly, the 350 microsecond timing period provided by the timer 46 enables the wide band signal components present at the output of wide band pass filter 34 to be accumulated within the integrator 36 for 350 microseconds, while avoiding contaminating that signal with noise occurring after the initial 350 microsecond period.

Also, the strobe output on lead 42 from the threshold circuit 22 is coupled to a pulse width detector network 48 to derive a signal proportional to the width of the lightning discharge, i.e., the time from the initial discharge to the first zero crossing of that discharge. A signal representing that time period is then passed to the integrator 50 to provide a voltage pulse on lead 56 which is proportional to the time between the initial discharge and the first zero crossing.

The respective $H_x$ and $H_y$ outputs from the far field detector 18 are coupled to a level shift and/multiplexer network 58 within which the signals are compressed into two different scales to enable a wider dynamic range in the ultimate display. The resultant signals with shifted levels are then coupled to an A/D converter 60 to provide digital representations of the far field $H_x$ and $H_y$ signals for subsequent signal processing. In a like manner, the integrated signals from the mid field detector 20 are coupled to a dual range level shifting multiplexer network 62, and the resultant dual level signals are coupled through the A/D converter 60 to provide corresponding digital signals.

As further shown in FIG. 1B, the digitized signals are thereafter processed to obtain appropriate signals for display via a digital circuit 66. The circuit 66 includes a microprocessor 68, providing overall control, an input/output controller 70, a program memory 72, a data memory 74, a video memory 76, a video control network 78 and the display unit 80. Both data signals and process control signals or address signals are coupled through each of these components via a bus line shown generally as element 82. Thus in a very generalized manner, under control of the microprocessor 68 and the input/output controller 70, data signals from the converter 60 are coupled on the bus 82 to the data memory 74. Thereafter, under control of instructions from the program memory 72, the data signals are processed to obtain direction and range information, which is temporarily stored in the video memory 76. The video controller 78 subsequently addresses the video memory 76, and controls the output of the stored direction and range signals to the display 80 at appropriately timed intervals.

The details of the far field detector 18 are shown in FIG. 2. As the channels for the $H_x$ signal and $H_y$ signal are identical, only one of those channels has been set forth in FIG. 2. As may there be seen, the $H_x$ antenna 12 is AC coupled to a differential amplifier 84 to thereby provide a single ended output which is coupled through a variable gain amplifier 86 and thence on lead 87 to the far field detector shown generally as 18a, it being understood that an identical detector 18b not shown, would be provided for the corresponding $H_y$ signal. Accordingly, within the detector 18a is first included the amplifier/narrow band pass filter 26 which comprises a pair of two pole active band pass filters 90 and 92, each of which has a gain of ten, a Q factor of five and is tuned to a band pass frequency of 50kHz. The direct output of the final stage 92 is then provided on terminal 94 while an inverted output is provided through inverter 96 and provided on terminal 98.

Details of the mid field detector 20 are shown in FIG. 3, and as both the $H_x$ and $H_y$ detectors are identical, only a single one, 20a is there shown for processing the $H_x$ signals, it being understood that an identical one, 20b (not shown) would be included for processing the $H_y$ signals As shown in FIG. 3, the gain adjusted H signal from the antenna 12 is provided on lead 87 to the wide band filter stages 34. This filter provides an overall 0.25kHz to 250kHz band pass via a two pole 250kHz low pass filter 100 having a gain of two, and a two pole, 0.25kHz high pass filter 102 having a gain of five, to thereby provide a mid field, wide band pass, $H_x$ signal on lead 104.

Figures 4, 9B:
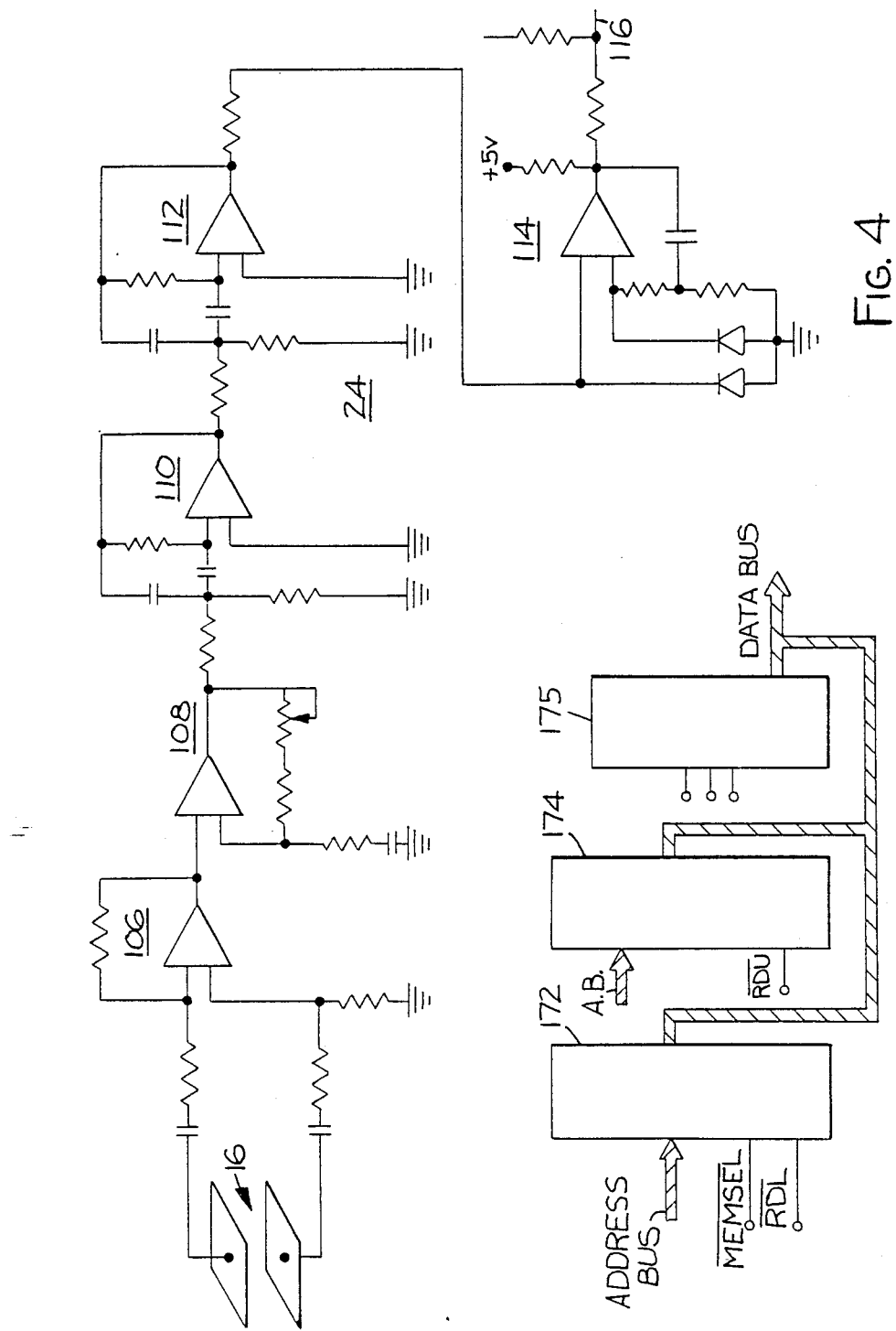
FIG. 4 is a more detailed circuit diagram of an electric field detector/processor portion of the embodiment of FIG. 1.
FIGS. 9A and 9B are more detailed circuit diagrams of the A/D converter portion of the embodiment of FIG. 1.

As shown in detail in FIG. 4, to provide the synchronous detection summarized above, the E field signal from the electric field antenna 16 is amplified via a differential amplifier and adjustable gain amplifier, 106 and 108 respectively, and the single ended output is then coupled to the amplifier/filter 24. This amplifier and filter is comprised of two, two pole, active band pass filters 110 and 112 each having a gain of ten, a Q of five and which are tuned to a band pass of 50kHz. The output of the last stage 112 is coupled to a pulse shaping circuit 114 which together with the associated components provides a square wave, "sync detect" output on lead 116, having the same frequency and pulse duration as the far field narrow band pass wave form on terminal 94, i.e., nominally 50kHz. The sync detect output is used to select between the non-inverted and inverted magnetic fields output at terminals 94 and 98. Assuming that either the normal or inverted output is in phase with the sync detect signal on lead 116, synchronous detection of one or the other of the $H_x$ signals will occur, thereby providing a full wave rectified input signal for subsequent processing. This also results in a validity determination that a lightning signal is actually present, since a lightning discharge will generate a simultaneous magnetic and electric field component. If no simultaneously occurring electric and magnetic field components are present, the signal coupled for subsequent integration will be minimal.

Figure 5:
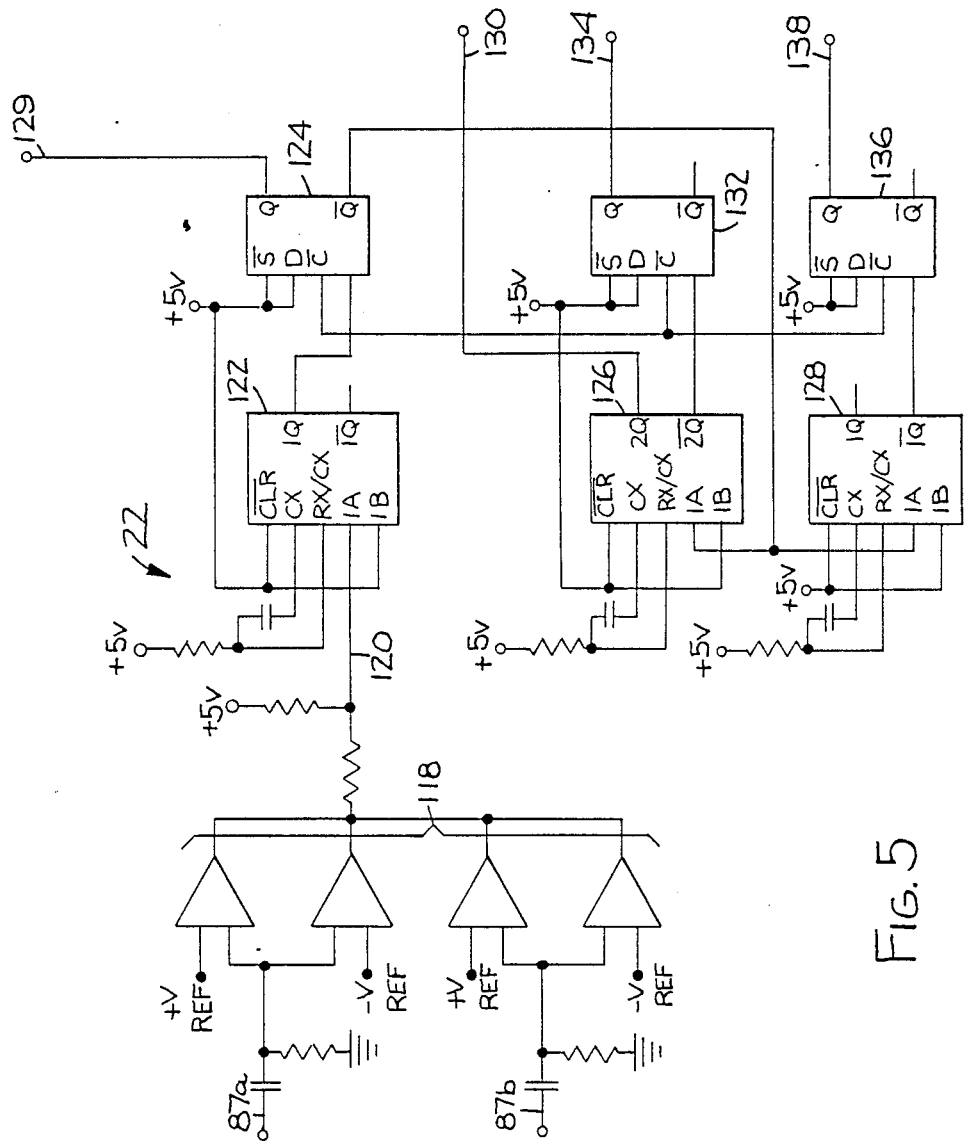
FIG. 5 is a more detailed circuit diagram of the threshold/delay networks of the embodiment of FIG. 1.

The details of the threshold detection circuit 22 are shown in FIG. 5, to include comparators 118 which compare the levels of the inputs of the gain adjusted H and $H_y$ signals on terminals 87a and 87b with reference voltages representative of the minimum signal level, corresponding to the most distant lightning strike, to be detected. In the event the incoming signals exceed the reference level, an output strobe signal is provided on lead 120. This signal is coupled to a monostable multivibrator 122, which in turn clocks a latch 124. The time constant for the monostable multivibrator 122 is set by external circuitry to 250 microseconds. Thus, if another lightning strike exceeding the threshold level, as evidenced by an input signal on lead 120, is received within the 250 microsecond time period, the monostable multivibrator 122 is retriggered and the subsequent strike is ignored, i.e., a minimum quiet time of 250 microseconds between strikes is required. An inverted output from the latch 124 is also used to trigger integration timers 126 and 128. The first timer 126 is set to provide a time constant of 80 microseconds, thus providing an integration period signal pulse on lead 130. The inverting output of the timer 126 is coupled to latch 132 to provide an integration hold signal on lead 134. Similarly, the inverted output of latch 124 is coupled to the second monostable flip-flop 128, which via its time constant determinating components provides an integration period of 350 microseconds. The output of the flip-flop 128 is in turn coupled to a latch 136 to provide a mid field hold signal on lead 138.

Figure 6:
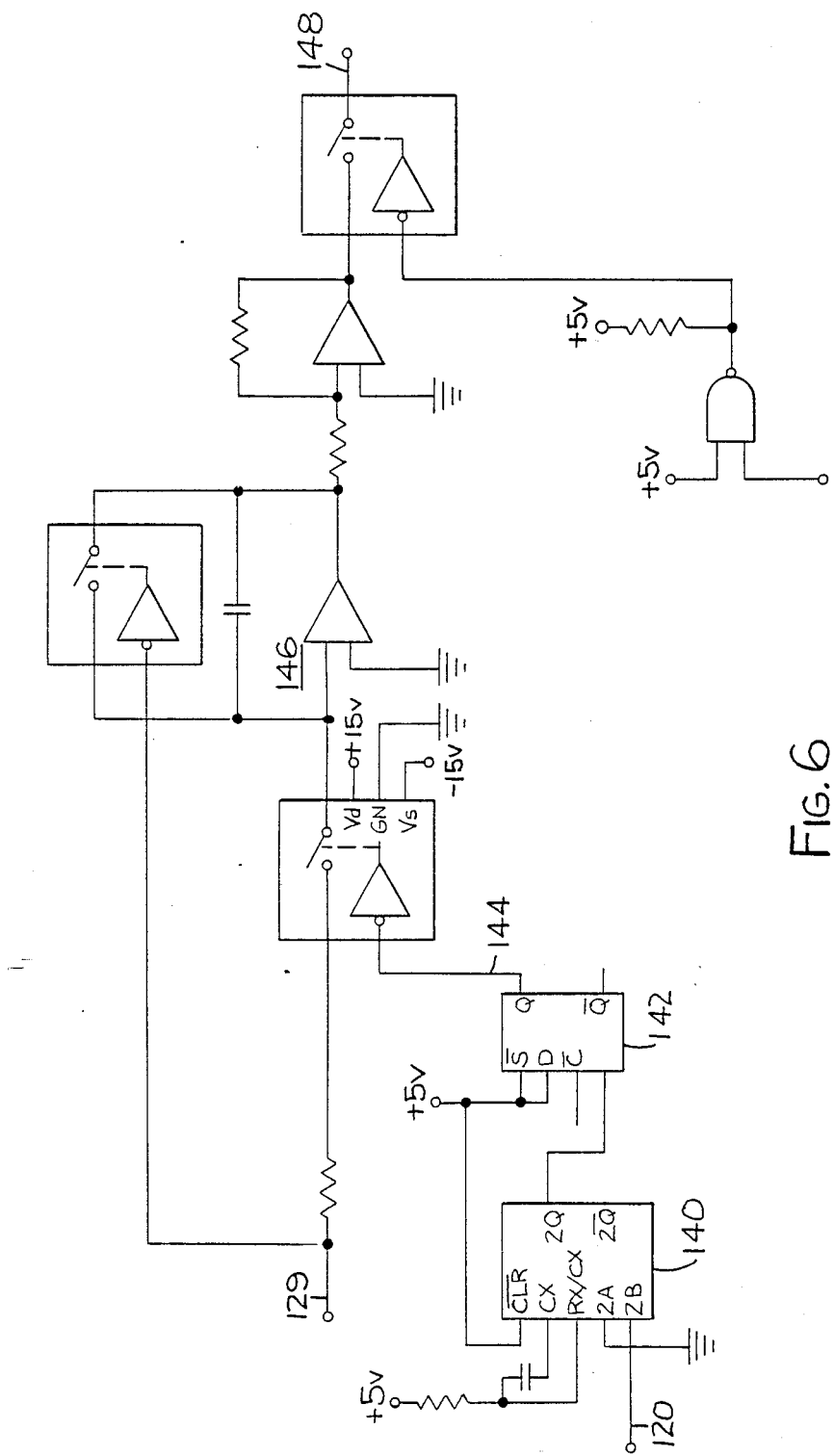
FIG. 6 is a detailed circuit diagram of a zero crossing detector desirably used with the present invention.

The details of the zero crossing timing circuit are shown in FIG. 6. As may there be seen, the strobe signal on lead 120 is coupled to a timing controller formed of a monostable flip-flop 140 and a latch 142 to thus provide a time of zero crossing timing signal on lead 144. This signal is then coupled to control the zero crossing integrator 146. Thus, the integrate signal on lead 129 keeps the output of the integrator shorted to the input until a strike occurs. Also, the hold signal on lead 144, which is normally low, enables the integrator input. Thus, when a strike occurs, the signal on lead 129 goes high, which enables the integrator and allows the integrator capacitor to charge. When the strike signal recrosses zero, the monostable flip-flop 140 and the latch 142 are triggered, causing the signal on lead 144 to go high, which in turn cuts off the input to the integrator. Since the input to the integrator is a constant voltage, the integrated, time-of-zero crossing signal on lead 148 is thus proportional to the time of integration.

The details of the far field and mid field integrators are shown in FIG. 7. As both the $H_x$ and $H_y$ integration circuits are identical, only that corresponding to the $H_x$ signals is there shown. As there shown, the integrator circuit for the far field $H_x$ signal 32 consists of an analog switch 150 and an integrator 152. At quiescence, the output of the integrator 152 is tied to its input through the analog switch 150, resulting in zero charge. For this narrow band integrator, the far hold signal on lead 134 is normally high, thus asserting the enable lead on the analog switch 150, and the far field integration on lead 130 is normally low, thereby enabling the switch 150 to short out the integrator. Also as there shown, the synchronous detect signal on lead 116 enables the switch 150 to pass either the inverted or non-inverted signal on leads 94 and 98 to the integrator 152. The resultant integrated signal is then output on lead 154.

Similarly, the mid field integrator 36 may be seen to comprise an integrator 156 and analog switches 158 and 160 respectively, each of which is controlled by the integrate enable signal on lead 129 and the mid field hold signal on lead 138. As these respective inputs are normally low, the switches 158 and 160 are thus closed, thereby shorting out the integrator 158 except when activated during the appropriate time period. The output of the integrator 156 is then coupled on lead 162.

In a preferred embodiment, not shown in the block diagram of FIG. 1, an antenna fault circuit is desirably provided to ensure that the respective antennas are properly functioning. Thus as shown in FIG. 8, each of the respective antennas outputs, such as that from the $H_x$ 12a, the $H_y$ antenna 12b (not shown) and the E field antenna 16 are coupled to a diode network 164, the output of which is coupled to a window detector 166. As there shown, all of the six antenna lines are biased by a very small current. These lines are normally held at a zero voltage via amplifiers included within each of the respective antennas (not shown). Thus if any of the antenna amplifiers fail, so as to provide an open output, or if an antenna line opens, the applied bias current will cause the voltage on that line to rise above the threshold of the window detector 166. This causes the output of the detector to go low, thereby providing an antenna fault signal on lead 168. Additionally, if any of the antenna amplifiers fail so that the output goes to a negative supply voltage, the comparator negative threshold will be crossed, again causing the window detector 166 to provide an antenna fault signal on lead 168.

Figure 9A:
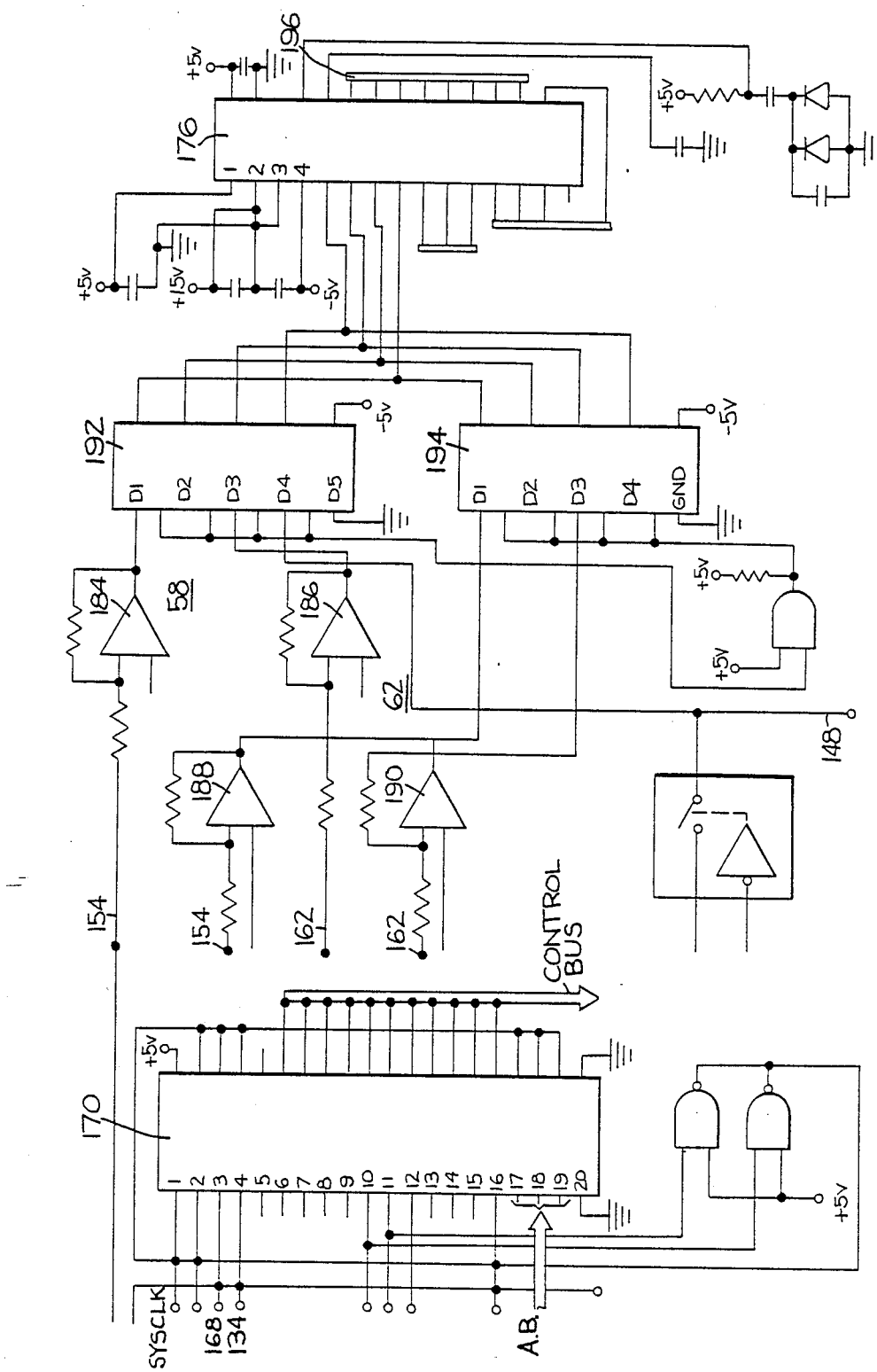

Virtually all of the interface between the system microprocessor 68 in FIG. 1 and the analog signal processing networks (FIGS. 2–8) is shown in FIG. 9A to be handled by a programable logic device/controller 170. This device controls the decoding of the address bus to select appropriate instructions from the onboard memories 172 and 174, the interrupt vector generator 175 (FIG. 9B), the A/D converter 176, the full scale/zero crossing time selection, the reset signal, the antenna fault signal and the generation of appropriate handshake acknowledge signals for each occurrence of data transfer into or from the respective analog signal circuits. The controller 170 also prioritizes interrupts from the A/D converter 176 and from the far field timing circuits via the far hold signal on lead 134. The controller 170 finally generates appropriate handshake acknowledge signals as required to effect the appropriate data transactions. As further shown in FIG. 9A, the integrated far field and mid field signals on leads 154 and 162 respectively are applied to a level shift and compression network shown generally as elements 58 and 62. As shown in more detail in FIG. 9A, in which only that portion pertaining to the processing of the $H_x$ signals is shown, that pertaining to $H_y$ being identical, the integrated signals are coupled to level shifting compression amplifiers 184, 186, 188 and 190, and the respective outputs therefrom are coupled to multiplexers 192 and 194. The outputs from multiplexer 192 are initially coupled to the A/D converter 176 to provide corresponding digital output data on the data bus 196. The digitized values on the data bus 196 are then read under the control of the microprocessor. If the digitized values are found to be less than one fourth of full scale, the controller 170 enables the outputs from the multiplexer 194 to be coupled to the A/D converter 176 for subsequent processing. As is also shown in FIG. 9A, the time-of-zero crossing signal as provided on lead 148 is multiplexed onto the full scale multiplexer 192 via appropriate analog switches.

The A/D controller 176 is desirably a four channel 12 bit successive approximation converter, having a full scale input range of 0 to 5 volts. The channel to be converted is selected by appropriate instructions from the controller 170. Appropriate reference voltages to the converter are provided via a band gap type voltage reference, thereby providing an accuracy of ± one percent.

Figure 10:
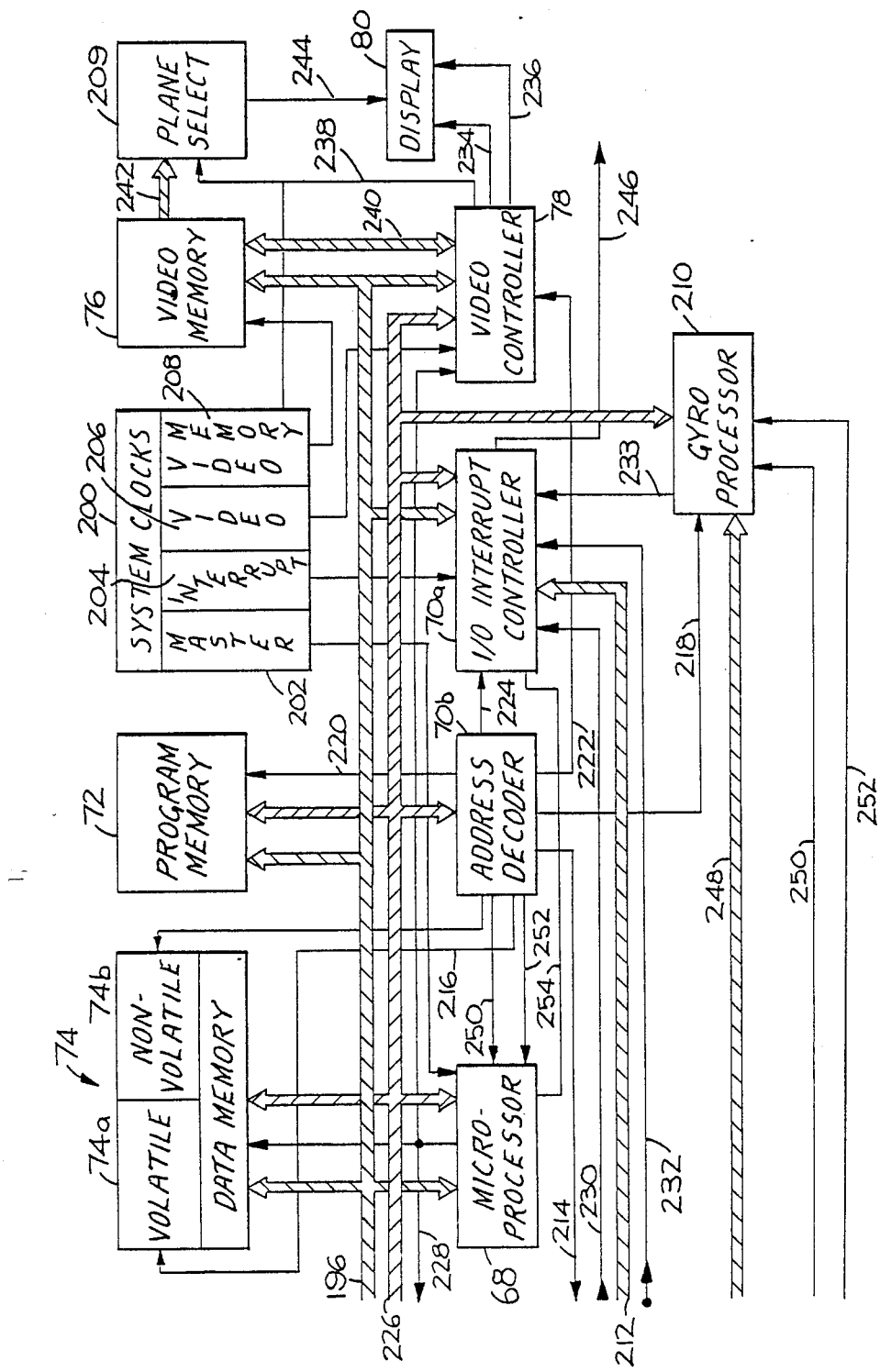
FIG. 10 is a more detailed block diagram of the digital signal processing portion of the embodiment of FIG. 1.

The details of the digital signal processing portion of the invention are set forth in FIG. 10. As may there be seen, the digitized data signals output from the A/D converter 176 are input to the digital board on data bus 196. Within the digital board, the signals are stored in data memory, which is comprised of a volatile memory 74a and a non-volatile memory 74b. Preferably, the volatile memory 74a comprises two sections of 32 kilobit ram memory chips for temporarily storing the integrated and digitized signal processing information. The non-volatile portion of the data memory 74b is desirably provided to store optional information unrelated to the location of lightning phenomena, such as pilot checklists, diagnostic information, and/or system run time data, etc. In particular, the non-volatile data memory 74b consists of two EEPROMS each of which is organized as an 8K by 8 byte memory to provide a total of 16Kbytes of non-volatile memory.

The digital board further includes a program memory 72 which preferably consists of two EPROMS, each of which is organized as a 32K by 8 byte memory to provide a total of 64Kbytes (32K words) of program memory. The digital board also includes a video memory 76, video controller 78 and display 80. Providing overall control to the digital board is a microprocessor 68 and an input/output, interrupt and system controller 70. Not shown in FIG. 1, the digital board further comprises a system clock 200 which is made up of subclock sections, including a master clock 202, an I/O-interrupt clock 204, a video clock 206, and a video memory clock 208. To enable reconfiguration of the display in response to changes in the heading of an aircraft, the system further preferably includes a gyro processor 210 responsive to gyroscopic information input from the aircraft. This information is further processed to modify the display as appropriate. Additional inputs from control switches and the like are provided on leads 212 and 232. Further, the microprocessor 68 is desirably buffered from the related memories and controllers via a data buffer, an I/O control buffer and a display buffer (not shown).

The heart of the digital board circuitry is the microprocessor 68. This processor controls the functions both in the digital board as well as numerous functions described hereinabove with regard to the analog portion of the system. Preferably, the processor is a type 68000 microprocessor, such as produced by Motorola. Detailed information concerning such microprocessors may be found in the Motorola MC68000 data book (October, 1985). The system clock 200 is made up of a master clock portion 202 which provides a basic ten megahertz system clock signal. This clock signal s used both directly by the microprocessor 68, and also controls the remaining more specific clock subsystems. Thus, for example, the video clock 206, is driven by a ten megahertz signal from the master clock, dividing it by two to generate a five megahertz video clock signal which is used by the video systems controller 78 for timing the resultant display. Likewise, the video memory clock 208 is generated by gating the video clock signal from the subsystem 206 with the video blanking signal, thus ensuring that display information is clocked out of the video memory 76 only during active display times. Finally, the I/O-interrupt clock 204 is driven by the five megahertz video clock signal, dividing it by two to produce a 2.5 megahertz clock signal which is coupled to the system controller 70.

Program control logic for the digital board is generated by the I/O controller 70a and address decoder 70b. The address decoder 70b, preferably a programmable logic device, responds to the six most significant address lines from the microprocessor 68 and generates a select signal, controlling the interactions with the analog board, on lead 214, a ram data select signal on lead 216, a gyro processor select signal on lead 218, a program ROM memory select on lead 220, a video controller select signal on lead 222 and an I/O controller select signal on lead 224. The remaining address lines are routed to the memory and peripheral devices to select locations for data access.

In addition, the microprocessor 68 generates both upper and lower data strobes to control access to the most and least significant data bytes stored within the system memory and peripheral devices via fifteen address lines appearing on the address bus 226. Also a read/write control signal 228 from the microprocessor is coupled throughout the system to control data reading and writing.

The address decoder 70b also generates a data transfer acknowledge signal 250 which is coupled to the microprocessor to indicate that the access time of the selected device has been satisfied. If an address device fails to respond by asserting an appropriate acknowledge signal, a bus error signal 252 is generated which causes the microprocessor to initiate an error handling routine thereby processing the bus error condition.

The 68000 type microprocessor 68 operates on seven levels of interrupt priority. In this system, level zero is the normal operating level, level one is used for all off-board interrupts, level five is used for all digital-board interrupts, and level seven, the highest level, is used by the microprocessor emulator for software development. All other interrupt priority levels are presently unused. All digital board interrupt requests, such as the analog interrupt appearing on lead 230, the push button and "microphone-transmission-inhibit" inputs on bus 212 and lead 232, respectively, and the gyro interrupt on lead 233 are handled by the I/O interrupt controller 70a. This controller. prioritizes the incoming interrupts and issues an interrupt request which is fed to the microprocessor 68 via lead 254. Thus when the microprocessor 68 is ready to service an interrupt request, the appropriate control lines are set to indicate that an interrupt acknowledge cycle is in progress. These lines are decoded in the interrupt controller 70a to produce appropriate interrupt acknowledge signals. Thus when the interrupt controller 70a receives the appropriate interrupt acknowledge signal, the interrupt vector is issued for the highest priority interrupt requested on the data bus. This vector is then used by the microprocessor 68 to determine the address of the software interrupt service routine.

In addition to handling interrupt functions, the controller 70a serializes input and output data flow. To further manage such communications, the I/O-interrupt clock 204 is input into the interrupt controller 70a, within which that clock signal is further divided down to produce a 9600 baud data rate to control serial communications with external test equipment. The I/O-interrupt controller desirably consists of a programmable logic device and a 68901 Multi-Function Peripheral (MFP) such as produced by Motorola. Detailed information on MFP may be found in the Motorola MC68901 Multi-Function Peripheral data book (January, 1984).

The video controller 78 generates video horizontal and vertical sync pulses 234 and 236 respectively, and video blanking signal 238. The video controller 78 also controls the access and timing for the video memory 76. Accordingly, the video controller 78 operates in response to address information from the microprocessor on bus 226 and creates video address signals on bus 240. Also, the video controller 78 generates column address strobe and row address strobe signals to provide access and refresh timing for the video memory 76. Preferably, the video controller is a type 34061 Video System Controller (VSC) such as produced by Texas Instruments. Detailed information concerning such devices may be found in the Texas Instruments TMS 34061 Users Guide (1986).

The video memory 76 is preferably formed of four 64K by 1 dynamic RAMS. These chips are organized as an array of 256 by 256×4 memory bits, with a 256 bit long internal shift register. The microprocessor 68 can access the video memory 76 directly while the video signal is being shifted out through the built-in shift register. Desirably, each of the four chips within the video memory is provided with its own row address strobe from the video controller to allow each chip to be individually controllable, thereby allowing separate access to each of the RAM chips. Each memory chip thus controls one video display plane, and these respective plane outputs are combined on bus 242 as input to the plane select 209. It is desired to configure the display to contain a plurality of separately controllable graphic information. Accordingly, the first plane ($P_0$) within the plane select 209 has the highest priority and contains all stationary graphics. The second plane ($P_1$) contains the background for the graphics in plane $P_0$. This means that whenever the second plane $P_1$ is active, video from the third and fourth respective planes are suppressed. The third and fourth planes ($P_2$ and $P_3$) contain all of the dynamic graphic information. Only one of those planes is displayed at a time, thereby enabling fresh information to be accumulated and processed in one of the two, while preceding information stored in the other planes is being displayed. The microprocessor 68 thus controls the read/write operations to the undisplayed plane and toggles appropriate control signals to enable display of the appropriate updated information. The output of the plane select 209 thus provides an appropriately serialized video output signal on lead 244 which is processed through buffers to the display 80.

In the event the microprocessor detects a fault in the overall system, the I/O controller 70a produces a system fault signal, which is output on lead 246. That signal in turn activates a light emitting diode.

The gyro processor 210 responds to three phase inputs on bus 248 which are derived from the aircraft gyro and indicate the heading of the aircraft. Also input to the gyro processor 210 oh leads 250 are two reference inputs enabling the phase of the gyro inputs to be determined. Included within the gyro processor 210 is a 400 hertz oscillator, which may be used to generate reference signals in the event the heading source lacks its own reference signals. In any event, the input gyro information and reference signals are converted into four trigonometric outputs which are then converted into corresponding digital values and output to the microprocessor 68 on address bus 226. The microprocessor 68 then uses these values to compute aircraft heading and modify the resultant video display as appropriate.

With regard to the transmitter inhibit signal provided on lead 232, in order to prevent invalid electrical data from being processed, it is necessary to inhibit operation of the detection system whenever the aircraft communications transmitter is transmitting. This is accomplished using a microphone input key which is grounded or goes low whenever the transmitter microphone key is depressed. This interrupt signal is then coupled as noted before on the lead 232.

In operation, raw strike information is fed from the analog board on the data bus 196 and is stored in the data RAM 74a. Using the raw strike data, and in response to program instructions stored within the program memory 72 and under control of the microprocessor 68, a software algorithm calculates the strike position relative to the aircraft. The aircraft heading obtained from the gyro processor 210 is subtracted from the strike bearing to produce a normalized bearing to the strike, which is stored in the data memory for subsequent processing via the video portion of the digital circuitry and ultimate display. Accordingly, the relative strike position information is stored in appropriate data buffers for use in the display calculations. Preferably, eight such display data buffers are provided, corresponding to four ranges (25 nautical miles (NM), 50 NM, 100 NM and 200 NM) in each of two views (360° and 120° sector view). Thus each display buffer contains the 256 most recent strikes applicable to each range and view. If strike information remains in a buffer for 2 or 4 minutes, depending on aircraft speed without being replaced by new strike information, it is desirably erased.

The ranging algorithm basically determines the larger X or Y signal and divides the far field signal by the mid field signal to yield the basic range. A dividing correction factor utilizing the time-of-zero crossing signal is preferably used to modify the ranging algorithm to account for different discharge signal characteristics. Thus, for example, it has been found that various types of discharges vary somewhat in frequency composition, particularly in the 50kHz range presently used when isolating the far field signal components. Particularly, intracloud discharges exhibit a rapid succession of very narrow pulses having a time-of-first-zero crossing in the range of 5 microseconds, whereas cloud-to-ground discharges exhibit fewer and wider pulses having a time-of-first-zero crossing in the range of 20–50 microseconds. The narrower pulses exhibit a somewhat smaller 50kHz component, such that a far field based signal arising therefrom will be relatively low. As range is preferably determined in the present invention as the ratio of the far field/mid field signals, it will be recognized that the determined range will also be somewhat less. Accordingly, in a further, preferred embodiment, the time-of-first-zero crossing signal is used as a further divisor in the ranging algorithm such that less intense time-of-zero crossing signals, representative of shorter zero crossing times, results in increased, more accurate range values. As the limit of effective mid field signal is reached, the magnitude of the far field signal and the time-of-zero crossing signal may be utilized to provide extended ranging to 200 NM.

Once the strike location and gyro heading have been calculated, the algorithm stored within the program memory 72 and under control of the microprocessor 68 transforms the data for display. The strike data is read from the appropriate data buffer as indicated by the display range selected by push button input on bus 212. The current aircraft heading from the gyro processor is then added to the normalized strike bearing to correct for turns. Once the display position has been calculated for a strike, it is written to the video memory 76.

The strike symbol on the display is desirably a cross. Since the display is desirably a monochrome CRT with a single brightnesss level, use of a cross produces a "contoured" display effect where overlapping strikes appear brighter. Similarly, stronger discharges may be shown with a different shape or size, and the rate of discharge activity may be used to cause the displayed data to flash when the rate of incoming strike produced signals exceeds a reference rate. The video memory is updated whenever new strike information is received or the aircraft heading changes.

I claim:

1. An apparatus for determining geographic locations of electrical disturbances generated by weather phenomena relative to an observation location, comprising
    means for independently receiving signals associated with the electromagnetic fields generated by said electrical disturbances which are indicative of the direction from the observation location to the location of the disturbances,
    means for isolating from said received signals at least first components of said fields, the intensities of which are inverse functions of the distance between the discharges and the observation location,
    means responsive to said received signals for generating pulse width signals proportional to the time between the beginning of each of the discharges and the first zero crossing of that discharge,
    means for simultaneously combining said first components and said pulse width signals and for deriving therefrom a range signal which is indicative of said distance, the inclusion of the pulse width signals in deriving said range signal thereby improving the accuracy of said range signal, and means responsive to said direction indicative received signals for deriving a direction signal, whereby said range and direction signals may be used to control display means to provide a map-like display of the location of said disturbances relative to said observation location.

2. An apparatus according to claim 1, wherein said receiving means comprises means for independently receiving signals which are related to at least two separate components of electromagnetic fields associated with such disturbances, wherein said isolating means comprises means for isolating at least first and second components, the intensity of each being a different inverse function of said distance, and wherein said combining means comprises means responsive to said first and second components and said pulse width signals for deriving therefrom said range signal.

3. An apparatus according to claim 1, wherein said range signal deriving means further comprises means responsive to the combination of said first and second components and said pulse width signals for modifying said range signal to include generalized distance information, whereby said display means may be controlled to indicate stronger electrical disturbances with a different character or size symbol.

4. An apparatus according to claim 1, wherein said means for deriving said range signal further comprises means responsive to the rate at which incoming electrical disturbance signals are received for modifying said range signal to cause displayed data to flash when said incoming signals are received at a rate exceeding a reference rate.

* * * * *

UNITED STATES PATENT AND TRADEMARK OFFICE
CERTIFICATE OF CORRECTION

PATENT NO. : 4,873,483

DATED : October 10, 1989

INVENTOR(S) : Kenneth A. Ostrander

It is certified that error appears in the above-identified patent and that said Letters Patent is hereby corrected as shown below:

ON TITLE PAGE:

In the Abstract, "distance." should read --distance, which ratio is further modified by a signal derived from the time-of-first zero crossing of the lightning produced signals.--

Column 2, line 11, "the disturbance a disturbance." should read --the disturbance.--

Column 2, line 49, after "distance." a paragraph break should be added.

Column 2, line 60, "distance Digital" should read --distance. Digital--.

Column 3, lines 36-37, "distance Assuming" should read --distance. Assuming--.

Column 4, line 8, "H and Hr" should read --$H_x$ and $H_y$--.

Column 7, line 58, "signals As" should read --signals. As--.

UNITED STATES PATENT AND TRADEMARK OFFICE
CERTIFICATE OF CORRECTION

PATENT NO. : 4,873,483

DATED : October 10, 1989

INVENTOR(S) : Kenneth A. Ostrander

It is certified that error appears in the above-identified patent and that said Letters Patent is hereby corrected as shown below:

Column 8, line 28, "adjusted H" should read --adjusted $H_x$--.

Column 11, line 16, "signal s" should read --signal is--.

Column 13, line 19, "oh" should read --on--.

Signed and Sealed this

Eighth Day of October, 1991

Attest:

HARRY F. MANBECK, JR.

Attesting Officer

Commissioner of Patents and Trademarks